United States Patent [19]

Nabhani

[11] Patent Number: 4,568,395

[45] Date of Patent: Feb. 4, 1986

[54] PRECLEANER SYSTEM AND SOLDERING FLUX

[76] Inventor: Abdol R. Nabhani, 5507 Roberts Dr., Dunwoody, Ga. 30338

[21] Appl. No.: 732,108

[22] Filed: May 10, 1985

[51] Int. Cl.$^4$ .............................................. B23K 35/34
[52] U.S. Cl. ......................................... 148/23; 148/25
[58] Field of Search ..................................... 148/23, 25

[56] References Cited

U.S. PATENT DOCUMENTS

| | | | |
|---|---|---|---|
| 2,493,676 | 1/1950 | Langlois et al. | 148/23 |
| 2,581,820 | 1/1952 | Stright | 148/23 |
| 2,687,362 | 8/1954 | Rueggeberg | 148/23 |
| 3,199,190 | 8/1965 | Laudenslager, Jr. | 228/223 |
| 3,206,324 | 9/1965 | Daesen | 117/51 |
| 3,264,146 | 8/1966 | Marks | 148/23 |
| 3,357,093 | 12/1967 | Bauman | 29/495 |
| 3,814,638 | 6/1974 | Jordan et al. | 148/23 |
| 3,832,242 | 8/1974 | Cuthbert | 148/23 |
| 3,865,641 | 2/1975 | Aronberg | 148/23 |
| 3,895,973 | 7/1975 | Stayner | 148/25 |
| 3,912,550 | 10/1975 | Bolte et al. | 148/23 |
| 4,077,815 | 3/1978 | Schuessler | 148/23 |
| 4,092,182 | 5/1978 | Arbib et al. | 148/23 |
| 4,153,482 | 5/1979 | Stayner et al. | 148/23 |
| 4,196,024 | 4/1980 | Kenyon | 148/23 |
| 4,342,607 | 8/1982 | Zado | 148/23 |

Primary Examiner—Veronica O'Keefe
Attorney, Agent, or Firm—Dale Lischer; J. Rodgers Lunsford, III

[57] ABSTRACT

An improved activator system for a precleaner is formulated by combining either a carboxyl substituted pyridine or a carboxylamine substituted pyridine with a polyprotic acid. The preferred precleaner activator system combines nicotinic acid and phosphoric acid. An improved activator system for a soldering flux is formulated by combining an alkylamine with either a hydroxyl containing organic acid or a small molecular weight keto acid. The preferred flux activator system combines tetrahydrofurfurylamine and hydroxyacetic acid. A method for preparing and soldering metal surface using the precleaner and flux is carried out at relatively low temperatures and relatively short times.

12 Claims, No Drawings

PRECLEANER SYSTEM AND SOLDERING FLUX

BACKGROUND OF THE INVENTION

This invention relates generally to methods for preparing metal surfaces for soldering, and more particularly concerns precleaner compositions, soldering flux compositions, and methods for use of such compositions.

During the manufacture of electronic components, including printed wire assemblies and boards and especially integrated circuits, those components are subjected to elevated temperatures which accelerate the formation of oxides on the surface of the metal leads. These oxides and other contaminants must be removed from the leads before the leads can be soldered. Typically, integrated circuit leads are precleaned, fluxed, and then tinned with solder so that the leads are protected against further oxidation and can be easily soldered or reflowed later.

Generally the formulations for both precleaners and soldering fluxes include an activator system of one or more activators, a surfactant, and a solvent carrier. An activator is the ingredient which directly reacts with the oxides and contaminants on the metal leads to remove such oxides and contaminants. The surfactant is used to insure that the surface tension of the precleaner and the flux is such that they will easily wet the oxides and contaminants so that the activators are in intimate contact with the oxides and contaminants thereby enhancing the chemical action of the activators. The surfactants may conventionally include any of a large number of ionic and non-ionic surfactants. The solvent carriers for precleaners may conventionally include water, short-chained alcohols, glycol ethers, and the like. Solvent carriers for fluxes may include short-chained alcohol, glycol ethers, water, aliphatic and aromatic solvents, and the like.

Conventional precleaner activators include, either singly or in combination, mineral acids and/or salts and/or bases. The precleaner acids may include hydrochloric, hydrobromic, hydrofluoric, sulfuric, nitric, phosphoric, among others. The precleaner salts may include ammonium chloride, stannus chloride, ammonium persulphate, alkylaminehydrochlorides, zinc chloride, zinc ammonium chloride, alkanolamine hydrochlorides, among others. The precleaner bases may include mono-, di-, and triethanolamine, sodium hydroxide, potassium hydroxide, ammonium hydroxide, among others. The flux activators generally include a large assortment of organic and inorganic acids including halide-containing acids.

Halide-containing precleaners and fluxes have been found effective in removing oxides and contaminants on metal leads resulting from high temperature processing. The halides in the precleaners and fluxes, however, attack the leaded glass frit of the integrated circuits and cause corrosion and degradation of the components if the halide migrates into the component through flaws in the surface. As a result, halide-free precleaners and fluxes have been developed to preclean and flux integrated circuit leads in order to avoid the problems created by the halides in conventional precleaners and fluxes.

Halide-free mineral acids such as nitric acid and sulfuric acid have often been used in high concentrations in precleaner formulations but those acids may also lead to component malfunction. Nitric acid and sulfuric acid are known to etch and passivate the commonly used nickel alloy of the integrated circuit leads so that the leads cannot thereafter be successfully wetted by solder. Furthermore, nitric acid and sulfuric acid when used in precleaners at conventional high concentrations and temperatures represent a considerable health hazard due to their high degree of corrosivity and their evolution of toxic nitrogen oxides.

Halide-free fluxes which generally contain organic acids such as levulenic, citric, tartaric, adipic, acetic, and the like, have been used after the precleaners to complete the metal preparation prior to the application of solder to the metal leads. These formulations of halide-free fluxes may also contain organic amines and/or organic salts. Though safer for the components, these preparations generally lack the necessary activity to clean heavily oxidized component leads.

Laudenslager U.S. Pat. No. 3,199,190 discloses the use of hydroxyl containing organic acids such as hydroxyacetic acid in conjunction with an alkanolamine, such as monoethanolamine. Alkanolamines such as monoethanolamine, however, attack the leaded glass frit and produce azides which are left as residue.

Stright U.S. Pat. No. 2,581,820 discloses a combination of an organic acid and an ureas in conjunction with conventional wetting agents and solvent carrier. The organic acid is preferably lactic acid, and urea is the preferred ureas. The resulting flux, however, leaves a persistent residue which must be subsequently cleaned.

Jordan et al U.S. Pat. No. 3,814,638 discloses the use of a chelating agent such as 8-hydroxyquinoline which inactivates the metallic ions once they have been removed from the leads during the fluxing operation and prevents those metal ions from causing further oxidation of the metal leads during the fluxing operation.

SUMMARY OF THE INVENTION

It is an object of the present invention to provide activator systems for halide-free precleaners and halide-free fluxes which do not attack the electronic components on which they are used, do not constitute a health hazard for personnel using such precleaners and fluxes, allow for precleaning and fluxing operations to be carried out at relatively low temperatures, and provide precleaning and fluxing performance which is comparable to precleaners and fluxes containing halides.

It is a further object of the present invention to provide a halide-free precleaner which in addition to an appropriate solvent carrier and surfactant contains a carboxyl substituted pyridine or a carboxylamine substituted pyridine and a polyprotic acid.

It is also an object of the present invention to provide a halide-free flux which in addition to an appropriate solvent carrier and surfactant includes a combination of an alkylamine and either a hydroxyl containing organic acid or a small molecular weight keto acid.

It is a further object of the present invention to provide a method for precleaning, fluxing, and soldering electronic component leads using the halide-free precleaners and halide-free fluxes of the present invention. Specifically, the method for preparing and soldering the metal surfaces includes applying the precleaner at a relatively low temperature and for a relatively short time to the component leads by dipping or spraying, rinsing the precleaner from the leads, applying the flux to the leads by dipping, spraying, or foaming, and soldering by either dip, drag, or wave soldering.

It is an auxiliary object of the present invention to provide a flux activator system including an alkylamine and a hydroxyl containing organic acid or a small molecular weight keto acid which activator system can be used in connection with halide-free fluxes or halide-containing fluxes.

Other objects and advantages of the invention will become apparent upon reading the following detailed description.

DETAILED DESCRIPTION OF THE INVENTION

While the invention will be described in connection with the preferred embodiment and process, it will be understood that I do not intend to limit the invention to that embodiment or process. On the contrary, I intent to cover all alternatives, modifications, and equivalents as may be included within the spirit and scope of the invention as defined by the appended claims.

Precleaner

An improved precleaner for cleaning the electrical leads on electronic components is formulated by providing a precleaner activator system which comprises a first precleaner activator of either a carboxyl substituted pyridine or a carboxylamine substituted pyridine used in conjunction with a second precleaner activator which is a polyprotic acid. The precleaner activator system when used in combination with conventional surfactants and solvent carriers produces a precleaner which exhibits low toxicity, good oxide reduction in low concentrations and at low temperatures, and a low degree of residue.

With respect to the first precleaner activator, I have found that the useful carboxyl substituted pyridines for the improved precleaner include piccolinic acid, nicotinic acid, and isonicotinic acid. The carboxylamine substituted pyridines which I have found to be useful in carrying out the present invention include piccolinamide, nicotinamide, and isonicotinamide. The amount of first precleaner activator can range from 0.5% to 30% by weight of the precleaner formulation. The preferred first precleaner activator is nicotinic acid (niacin).

With respect to the second precleaner activator, namely the polyprotic acids, I have discovered that phosphoric acid and/or sulfuric acid can be used in conjunction with carboxyl substituted pyridines or carboxylamine substituted pyridines in formulating the precleaner activator system of the present invention. The amount of the second precleaner activator can range from 2.0% to 85% by weight of the precleaner formulation. Phosphoric acid is preferred as the second precleaner activator.

With regard to the surfactants, I have found that conventional ionic and/or non-ionic surfactants are useful in preparing the formulation for the precleaner of the present invention. The amount of surfactant can range from 0.1% to 10% by weight of the precleaner formulation. The preferred surfactant is an ethoxylated surfactant such as Triton X-100 manufactured of the Rohm & Haas Company of Philadelphia, Pa.

With regard to solvent carriers, I have found that appropriate solvent carriers include the conventional solvent carriers used in precleaners, such as water, short-chained alcohols, glycol ethers, and the like.

The combination of a carboxyl substituted pyridine or a carboxylamine substituted pyridine with a polyprotic acid provides for a wide range of precleaner formulations. The following examples are illustrative of the ranges for such formulations:

EXAMPLE 1

|  | Percentage Weight |
|---|---|
| Phosphoric Acid/Sulphuric Acid | 2.0% to 40.0% |
| Nicotinamide | 0.5% to 10% |
| Ethoxylated Surfactant | 0.2% to 5.0% |
| Water | Quantity sufficient to equal 100% |

EXAMPLE 2

| Phosphoric/Sulfuric Acid | 2.0% to 40% |
|---|---|
| Piccolinic Acid | 0.5% to 10% |
| Ethoxylated Surfactant | 0.2% to 5.0% |
| Water | 0% to 25% |
| Isopropanol | Quantity sufficient to equal 100% |

EXAMPLE 3

| Phosphoric Acid | 2.0% to 40% |
|---|---|
| Piccolinamide | 0.5% to 10% |
| Ethoxylated Surfactant | 0.2% to 5.0% |
| Ethylene Glycol Butyl Ether | 0.0% to 50% |
| Isopropanol/Water | Quantity sufficient to equal 100% |

Specific formulations which encompass the precleaner invention include:

EXAMPLE 4

|  | Percentage Weight |
|---|---|
| Phosphoric Acid | 10% |
| Nicotinic Acid | 2.0% |
| Ethoxylated Surfactant | 0.2% |
| Water | 87.8% |

EXAMPLE 5

| Sulfuric Acid | 10% |
|---|---|
| Isonicotinic Acid | 3.0% |
| Monoethanolamine | 2.0% |
| Ethoxylated Surfactant | 0.2% |
| Water | 84.8% |

EXAMPLE 6

| Sulfuric Acid | 3.0% |
|---|---|
| Phosphoric Acid | 7.0% |
| Isonicotinic Acid | 3.0% |
| Ethoxylated Surfactant | 0.2% |
| Water | 86.8% |

Precleaners made in accordance with Examples 1 through 6 above may be applied at ambient or at temperatures approaching the boiling point of water for times as short as five seconds, with most applications requiring approximately twenty to sixty seconds. This performance is in marked contrast to many prior art precleaners which may require temperatures near the boiling point of water and as much as an hour of soaking time.

In addition, the precleaners of the present invention (e.g., Examples 3 and 4) are relatively noncorrosive and therefore safe to handle. The precleaners of the present invention do not produce toxic oxides of nitrogen as compared to conventional precleaners.

Flux

The flux of the present invention includes a unique activator system which is combined with conventional surfactants and solvent carriers. The flux activator system comprises a first flux activator which is an alkylamine and a second flux activator which is either a small molecular weight keto acid or a hydroxyl containing organic acid.

With regard to the alkylamine, I have found that tetrahydrofurfurylamine, dimethylamine, diethylamine are useful in carrying out the invention. The amount of the alkylamine can range from 0.5% to 50% by weight of the flux formulation. Tetrahydrofurfurylamine is the preferred alkylamine for the present invention.

With regard to the hydroxyl containing acids, I have found that hydroxyacetic acid, para-hydroxyphenylacetic acid, para-hydroxybenzoic acid, mendelic acid, and related acids, are useful in carrying out the present invention. The amount of such acid can range from 1.0% to 50% by weight of the flux formulation. Hydroxyacetic acid, however, is preferred.

With regard to small molecular weight keto acid, small molecular weight means about 2 to 8 carbon atoms, and such acids include glutaric acid and levulinic acid. The amount of such acid can range from 1.0% to 50% by weight of the flux formulation. The preferred small molecular weight keto acid is levulinic acid.

With regard to the surfactant, I have found that both conventional ionic and non-ionic surfactants such as those used with the precleaner are useful in carrying out the invention.

With regard to the solvent carrier, I have found that short-chained alcohols, glycol ethers, water, and aliphatic and aromatic solvents can be used in carrying out the present invention, such solvent carriers being well known in the flux art.

Flux activator systems of an alkylamine use in conjunction with either a hydroxyl containing organic acid or a small molecular weight keto acid are effective over a broad range of concentrations, and the following examples illustrate the range for fluxes made in accordance with the present invention:

EXAMPLE 7

| | Percentage Weight |
|---|---|
| Hydroxyacetic Acid | 1.0% to 20% |
| Dimethylamine | 0.5% to 20% |
| Citric Acid (chelating agent) | 1.0% to 20% |
| Ethyoxylated Surfactant | 0.1% to 5.0% |
| Isopropanol/water | Quantity sufficient to equal 100% |

EXAMPLE 8

| | |
|---|---|
| Hydroxyacetic Acid | 0.5% to 10% |
| Tetrahydrofurfurylamine | 0.1% to 5.0% |
| W.W. Gum Rosin | 1.0% to 55% |
| Ethoxylated Surfactant | 0.2% to 2% |
| Isopropanol/Glycol ether | Quantity sufficient to equal 100% |

Specific formulations illustrating the flux invention include:

EXAMPLE 9

| | |
|---|---|
| Hydroxyacetic Acid | 4.0% |
| Tetrahydrofurfurylamine | 4.0% |
| Isopropanol | 92% |

EXAMPLE 10

| | |
|---|---|
| Levulinic Acid | 6.5% |
| Tetrahydrofurfurylamine | 6.0% |
| Ethoxylated Surfactant | 0.5% |
| Ethylene Glycol Butyl Ether | 15% |
| Ethyl Alcohol | 72% |

While the invention is primarily directed to making halide-free fluxes, the flux activator system of the present invention comprising an alkylamine with either a hydroxyl containing organic acid or a small molecular weight keto acid may also be used to enhance the performance of otherwise conventional resin (including rosin) and halide-containing fluxes. The following formulations are illustrative of such improved halide-containing fluxes:

EXAMPLE 11

| | Percentage Weight |
|---|---|
| Hydroxyacetic Acid | 0.5% to 10% |
| Tetrahydrofurfurylamine | 0.1% to 5.0% |
| Cyclohexylamine hydrobromide | 0.1% to 5.0% |
| Dymerex Resin* | 1.0% to 55% |
| Isopropanol | Quantity sufficient to equal 100% |

*Product of Hercles Inc.

EXAMPLE 12

| | |
|---|---|
| Hydroxyacetic Acid | 8.0% |
| Tetrahydrofurfurylamine | 7.0% |
| Hydrobromic Acid | 2.0% |
| Ethoxylated/Fluorinated Surfactant | 0.2% |
| Ethylene Glycol Butyl Ether | 15% |
| Isopropanol | 67.8% |

Method of Metal Preparation

Because the disclosed precleaners and fluxes of the present invention provide improved performance, the method for preparing and soldering the leads of electronic components can be more efficient than prior art methods. Specifically, precleaning can occur at temperatures generally below 150° F. and in most cases can be accomplished at ambient temperature, and the precleaning can be accomplished in times of less than one minute. The precleaners of the present invention are less corrosive than conventional precleaners and the disclosed precleaners do not produce toxic nitrogen oxides so that the need for special handling and precautions is eliminated.

Because the fluxes of the present invention are formulated so that they do not leave significant residue on the leads, cleaning can be done with merely a water rinse. Moreover resulting solder coat is smooth without heads or splashes from the flux action.

The following procedure is preferred for preparing and soldering the metal of electronic components.

First, the precleaner of the present invention (e.g. Examples 4, 5, or 6) is applied to the circuit component preferably by dipping. The precleaner is preferably maintained at ambient temperature but the temperature may be elevated up to the boil point of water.

Second, the component is rinsed with water. The time between dipping and rinsing is generally between 20 and 60 seconds although times as short as 5 seconds are effective where the precleaner is heated.

Third, the component is dried.

Fourth, the flux of the present invention (e.g. Examples 9 and 10) is applied to the component. Dipping is preferred.

Fifth, solder is applied to the component leads preferably by dipping. The time between dipping in the flux and dipping in the solder need only be several seconds in order for the flux to work. In addition, preheating of the leads between flux application and solder application may optionally be used to speed the flux action.

Sixth, the component is cooled, rinsed with water, rinsed with D.I. water, and finally dried.

I claim:

1. A precleaner activator system for a precleaner formulation comprising:
   (a) a first precleaner activator selected from the group consisting of a carboxyl substituted pyridine and a carboxylamine substituted pyridine; and
   (b) a second precleaner activator which is a polyprotic acid.

2. The precleaner activator system of claim 1, wherein the first precleaner activator is selected from the group consisting of piccolinic acid, nicotinic acid, isonicotinic acid, piccolinamide, nicotinamide, and isonicotinamide, and the second precleaner activator is selected from the group consisting of phosphoric acid and sulfuric acid.

3. The precleaner activator system of claim 1, wherein the first precleaner activator ranges from about 0.5% to about 30% by weight of the precleaner formulation and the second precleaner activator ranges from about 2.0% to about 85% by weight of the precleaner formulation.

4. A halide-free precleaner comprising:
   (a) A first precleaner activator selected from the group consisting of a carboxyl substituted pyridine and a carboxylamine substituted pyridine;
   (b) a second precleaner activator which is a polyprotic acid;
   (c) a surfactant; and
   (d) a solvent carrier.

5. The precleaner of claim 4, wherein the first precleaner activator is selected from the group consisting of piccolinic acid, nicotinic acid, isonicotinic acid, piccolinamide, nicotinamide, and isonicotinamide and the second precleaner activator is selected from the group consisting of phosphoric acid and sulfuric acid.

6. The precleaner of claim 4, wherein the precleaner is comprised essentially by weight:
   (a) first precleaner activator — 0.5% to 30%
   (b) second precleaner activator — 2.0% to 85%
   (c) surfactant — 0.2% to 10%
   (d) solvent carrier — Quantity sufficient to make 100%.

7. A flux activator system for a flux formulation comprising:
   (a) a first flux activator which is an alkylamine; and
   (b) a second flux activator selected from the group consisting of a hydroxyl containing organic acid and a low molecular weight keto acid.

8. The flux activator system of claim 7, wherein the first flux activator is selected from the group consisting of tetrahydrofurfurylamine, dimethylamine, and diethylamine, and the second flux activator is selected from the group consisting of hydroxyacetic acid, para-hydroyphenylacetic acid, para-hydroxybenzoic acid, mendelic acid, glutaric acid, and levulinic acid.

9. The flux activator system of claim 7, wherein the first flux activator ranges from about 0.5% to about 50% by weight of the flux formulation and the second flux activator ranges from about 1.0% to about 50% by weight of the flux formulation.

10. A solder flux comprising:
    (a) a first flux activator which is an alkylamine;
    (b) a second flux activator selected from the group consisting of a hydroxyl containing organic acid and a low molecular weight keto acid;
    (c) a surfactant; and
    (d) a solvent carrier.

11. The flux of claim 10, wherein the first flux activator is selected from the group consisting of tetrahydrofurfurylamine, dimethylamine and diethylamine and the second flux activator is selected from the group consisting of hydroxyacetic acid, para-hydroxyphenylacetic acid, para-hydroxybenzoic acid, mendelic acid glutaric acid, and levulinic acid.

12. The flux of claim 10, wherein the flux is comprised essentially by weight:
    (a) first flux activator — 0.5% to 50%
    (b) second flux activator — 1.0% to 50%
    (c) surfactant — 0.2% to 10%
    (d) solvent carrier — Quantity sufficient to make 100%.

* * * * *